(12) United States Patent
Godfrey et al.

(10) Patent No.: US 10,900,537 B2
(45) Date of Patent: Jan. 26, 2021

(54) VIBRATION ISOLATOR ASSEMBLIES AND METHODS FOR THE MANUFACTURE THEREOF

(75) Inventors: Donald G. Godfrey, Phoenix, AZ (US); Brian Cottrell, Litchfield Park, AZ (US); Mark C. Morris, Phoenix, AZ (US); Zach Rogers, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 527 days.

(21) Appl. No.: 13/540,409

(22) Filed: Jul. 2, 2012

(65) Prior Publication Data

US 2015/0047935 A1 Feb. 19, 2015

(51) Int. Cl.
*F16F 9/19* (2006.01)
*B22F 5/10* (2006.01)
*B22F 3/24* (2006.01)
*B22F 3/105* (2006.01)
*F16F 9/32* (2006.01)
(Continued)

(52) U.S. Cl.
CPC .............. *F16F 9/19* (2013.01); *B22F 3/105* (2013.01); *B22F 3/1055* (2013.01); *B22F 3/24* (2013.01); *B22F 5/106* (2013.01); *F16F 9/103* (2013.01); *F16F 9/3214* (2013.01); *F16F 9/3235* (2013.01); *B22F 2003/241* (2013.01); *B22F 2003/242* (2013.01); *B22F 2003/247* (2013.01); *B22F 2003/248* (2013.01); *B33Y 80/00* (2014.12); *F16F 2226/00* (2013.01); *F16F 2230/105* (2013.01); *Y02P 10/25* (2015.11)

(58) Field of Classification Search
CPC ...... F16F 9/103; F16F 9/14; F16F 9/16; F16F 9/18; F16F 9/19; F16F 9/20; F16F 9/3207; F16F 9/361; F16F 2230/105; F16F 15/00; F16F 15/02; F16F 15/023; F16F 9/3214; F16F 9/3235; F16F 2226/00; B22F 3/105; B22F 5/106; B22F 3/24; B22F 3/1055; B22F 2003/247; B22F 2003/242; B22F 2003/241; B22F 2003/248; Y02P 10/25
See application file for complete search history.

(56) References Cited

U.S. PATENT DOCUMENTS

| 213,150 A | 8/1880 | Cliff |
| 4,837,697 A | 6/1989 | Eisa et al. |

(Continued)

FOREIGN PATENT DOCUMENTS

| DE | 102005056846 A1 | 5/2007 |
| DE | 102010006802 A1 | 8/2011 |

(Continued)

OTHER PUBLICATIONS

Obielodan, J.O.; Fabrication of Multi-Material Structures Using Ultrasonic Consolidation and Laser-Engineered Net Shaping; Utah State University DigitalCommons@USU, Dec. 1, 2010.

(Continued)

*Primary Examiner* — Melody M Burch
(74) *Attorney, Agent, or Firm* — Lorenz & Kopf, LLP

(57) ABSTRACT

A vibration isolator assembly includes a bellows component, a piston component, a shaft component, and a housing component, wherein at least one of the bellows component, the piston component, the shaft component, and the housing component is formed using additive manufacturing techniques.

8 Claims, 5 Drawing Sheets

(51) Int. Cl.
*F16F 9/10* (2006.01)
*B33Y 80/00* (2015.01)

(56) References Cited

U.S. PATENT DOCUMENTS

| | | | |
|---|---|---|---|
| 5,246,215 A | | 9/1993 | Takamura et al. |
| 5,687,958 A | | 11/1997 | Renz et al. |
| 5,992,584 A | * | 11/1999 | Moody .................. 188/297 |
| 6,193,225 B1 | | 2/2001 | Watanabe |
| 6,273,396 B1 | | 8/2001 | Kato |
| 6,517,060 B1 | * | 2/2003 | Kemeny ................ 267/136 |
| 6,634,472 B1 | * | 10/2003 | Davis et al. ............. 188/378 |
| 7,648,589 B2 | | 1/2010 | Taya et al. |
| 7,757,400 B2 | | 7/2010 | Widmer et al. |
| 7,931,643 B2 | | 4/2011 | Olsen et al. |
| 8,985,234 B2 | | 3/2015 | Gadzella et al. |
| 2005/0023075 A1 | * | 2/2005 | Schmaeman ............ 181/233 |
| 2005/0217954 A1 | * | 10/2005 | Hindle et al. ............ 188/298 |
| 2007/0132465 A1 | * | 6/2007 | Kreissig .......... G01R 31/2886 324/750.27 |
| 2008/0231046 A1 | * | 9/2008 | Osaka et al. ............ 285/145.5 |
| 2009/0131180 A1 | * | 5/2009 | Satoh .................. F16J 3/041 464/175 |
| 2009/0250852 A1 | | 10/2009 | Jones et al. |
| 2009/0306717 A1 | * | 12/2009 | Kercher et al. ........... 606/258 |
| 2010/0320358 A1 | * | 12/2010 | Boyd et al. ............... 248/636 |
| 2011/0190904 A1 | | 8/2011 | Lechmann et al. |
| 2011/0306949 A1 | | 12/2011 | Specht et al. |
| 2012/0007286 A1 | | 1/2012 | Shi |
| 2012/0247788 A1 | * | 10/2012 | Ford et al. ............... 166/387 |
| 2012/0267506 A1 | * | 10/2012 | Hadden et al. ........... 248/636 |
| 2013/0195665 A1 | * | 8/2013 | Snyder et al. ............ 416/174 |

FOREIGN PATENT DOCUMENTS

| | | |
|---|---|---|
| GB | 2131517 A | 6/1984 |
| JP | 2010101377 | 5/2010 |
| WO | 2007049429 A1 | 5/2007 |
| WO | 2011135087 A1 | 11/2011 |

OTHER PUBLICATIONS

Espalin, D. et al.; Multi-Material, Multi-Technology FDM System; W.M. Keck Center for 3D Innovation, Department of Mechanical Engineering, The University of Texas at El Paso, Aug. 15, 2012.

USPTO Office Action Notification dated Jun. 25, 2015; U.S. Appl. No. 13/742,210.

USPTO Office Action Notification dated Nov. 18, 2015; U.S. Appl. No. 13/742,210.

USPTO Notice of Allowance, Notification dated Mar. 18, 2016; U.S. Appl. No. 13/742,210.

EP Search Report for Application No. 13197873.6-1373 / 2754516 dated Jun. 26, 2017.

Ott et al.; Multi-Material Processing in Additive Manufacturing; Jan. 1, 2010.

Saleh et al.; Ti-6Al-4V Helical Spring Manufacturing via SLM: Effect of Geometry on Shear Modulus; Mar. 13, 2013.

Japanese Office Action for Application No. 2013-132666 dated Aug. 3, 2017.

European Search Report for Application No. 13173121.8 dated Feb. 2, 2018.

EP Examination Report for Application No. 13173121.8 dated Feb. 22, 2018.

Japanese Office Action for Application No. 2013-132666 dated Jan. 4, 2018.

* cited by examiner

VIBRATION ISOLATOR ASSEMBLIES AND METHODS FOR THE MANUFACTURE THEREOF

TECHNICAL FIELD

The present disclosure generally relates to vibration isolator assemblies and methods of manufacturing vibration isolator assemblies. More particularly, the present disclosure relates to vibration isolator assemblies manufactured using additive manufacturing techniques.

BACKGROUND

Many industrial, aerospace, and defense applications require components to be protected from environmental conditions such as vibration. One method of vibration protection is provided via the use of a vibration isolator positioned between the component sought to be protected and the condition causing the vibration. An exemplary class of vibration isolators known in the art includes those implementing Honeywell International Inc.'s D-Strut™ technology, which utilizes a three-parameter spring and damper system that is tuned to reduce system vibrations by incorporating hermetically sealed metallic bellows that are flexible and able to compensate for thermal contraction and/or expansions where rubber expansion joints will not work. An exemplary implementation for such vibration isolator assemblies is in the manufacture of gas turbine engines, wherein the vibration isolators are provided to isolate the aero-acoustic and rotor dynamic engine vibrations from an aircraft structure. Other exemplary implementations for vibration isolators include isolating launch vehicles from rocket motor and aerodynamic vibrations and isolating space telescopes from gyroscopic vibrations.

While numerous vibration isolator assemblies are known in the art, they all suffer from common challenges. These challenges include, but are not limited to, high part counts, assembly complexities, the requirement of hermetically sealed bellows, and limitations due to manufacturing constraints that may result in a sub-optimal configuration. Furthermore, fabrication of the bellows is costly, and the cycle time associated with the design and fabrication of the assembly is unacceptably high for many applications.

For example, it is commonly known that the bellows require a seamless and non-porous surface so that pressure can be maintained inside the bellows and dust and/or moisture will not penetrate the seams. Currently, metallic bellows are produced either by expansive-forming or by roll-forming techniques. A limitation of known roll-forming or expansive-forming technologies is the geometry or shape of the metallic bellows. Using existing technology, a bellows can only be circumferential if produced via roll-forming and either round or nearly round if produced via expansive forming.

Hence, there is a need for improved design and manufacturing approaches that enable optimized bellow designs while simultaneously lowering cost and cycle time. The present disclosure addresses at least these needs. Furthermore, other desirable features and characteristics of the vibration isolator assemblies will become apparent from the subsequent detailed description and the appended claims, taken in conjunction with the accompanying drawings and the preceding background.

BRIEF SUMMARY

Disclosed are vibration isolator assemblies and methods for manufacturing vibration isolator assemblies. In one embodiment, an exemplary vibration isolator assembly includes a bellows component, a piston component, a shaft component, and a housing component, wherein at least one of the bellows component, the piston component, the shaft component, and the housing component is formed using additive manufacturing techniques.

In another embodiment, an exemplary vibration isolator assembly includes a bellows component, a piston component, a shaft component, and a housing component, wherein the bellows component comprises one or more of a variable radius of curvature, a variable aspect ratio of the convolutes, and a tapering of wall thickness.

In yet another embodiment, an exemplary method for manufacturing a vibration isolator assembly is disclosed, the vibration isolator assembly including at least a bellows component, a piston component, a shaft component, and a housing component, the method including forming at least one of the bellows component, the piston component, the shaft component, and the housing component using manufacturing techniques; and assembling the bellows component, the piston component, the shaft component, and the housing component into a complete vibration isolator assembly.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
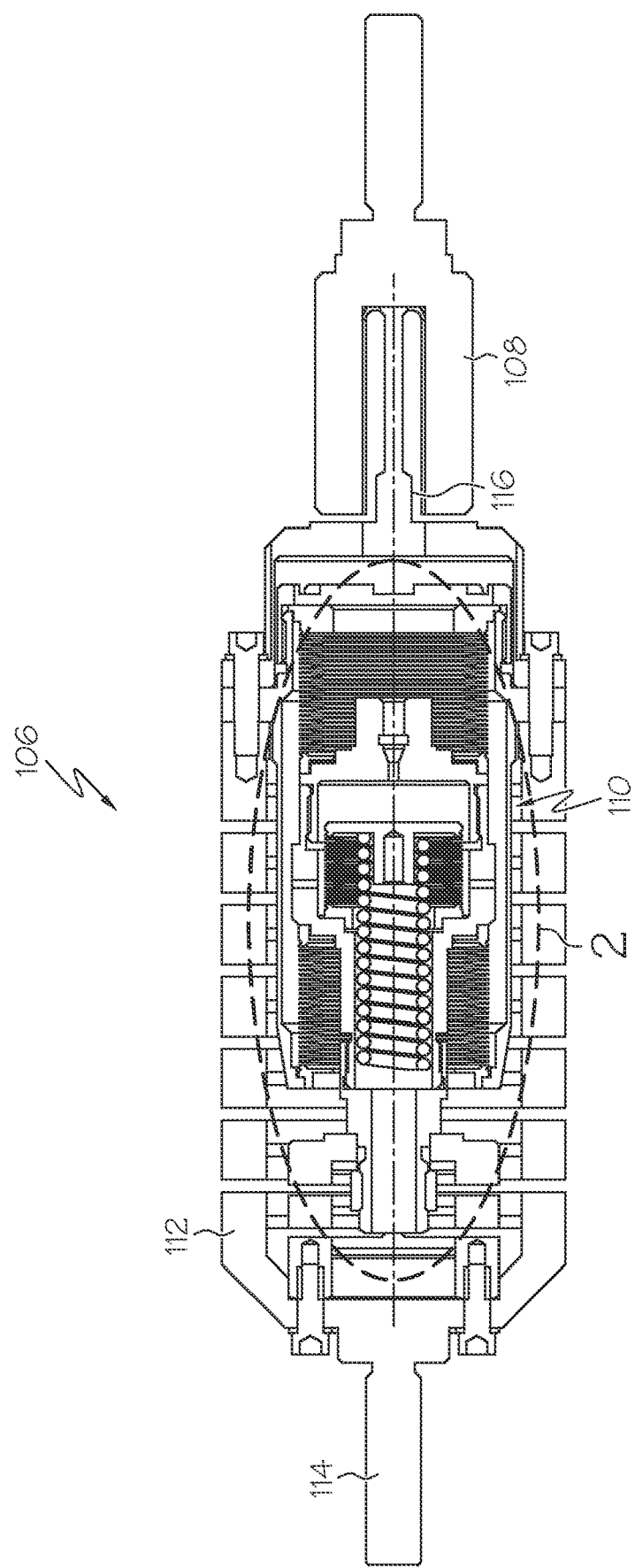
FIG. 1 is a cross-sectional view of an exemplary of a vibration isolator assembly.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations of the vibration isolator assemblies and methods for the manufacture thereof described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Disclosed herein is an enhanced vibration isolator assembly that is fabricated using a free-form manufacturing process for its production. Unlike known vibration isolator assemblies, embodiments of the present disclosure utilize a manufacturing process that incorporates a low energy density laser beam, referred to as "direct metal laser sintering" (DMLS) in a powder tank. This "free-form" or additive manufacturing process uses a small, focused beam to build a component by fusing one layer of powder to the fused layer of powder directly beneath it. The manufacturing methods disclosed herein utilize DMLS to build unique designs that are not possible with prior technologies such as investment casting, expansive, or rolled-forming technologies, where costly and time-consuming tooling is required.

Furthermore, DMLS is a manufacturing technology that is able to produce flexible joint assemblies from multiple materials. Manufacturing methods previously known in the art, such as roll-forming or expansion-forming, have limited capabilities. DMLS is a free-form approach to produce complex, novel designs not possible with methods previously known in the art since DMLS does not require tooling in the manufacturing process. For example, DMLS may be utilized to produce the bellows components of a vibration isolator assembly without the need for expansive- or rolled-forming technologies and without the need for complex welding processes that must maintain sealing all around the bellows.

Additionally, the methods of the present disclosure allow for optimization of the damper/spring assembly of a vibration isolator assembly by enabling variable wall thicknesses in the bellows assembly in both the thickness and convolute (turn-around) regions. The result thereof is a lower cost and robust assembly (from a sealing perspective) that may be optimized for an individual implementation much faster than previously available in the art.

Still further, the use of DMLS technology in connection with the manufacturing of vibration isolator assemblies as described herein enables a significant part count reduction from vibration isolator assemblies previously known in the art. Furthermore, by consolidating the entire manufacturing process in one DMLS environment, a fixed process may be employed to reduce variability in the assembly since all units are produced as one (or two) parts from the same machine and process. Multiple parts with their associated tolerance and variability (and defects) are no longer required. The result thereof is a reduced part count, optimized assembly that may be produced with lower cost and reduced cycle time when compared to previously known methods.

It will be appreciated that the methods presented herein can be applied to any vibration isolator assembly configuration to simplify and reduce the cost of the manufacture thereof, and to improve the reliability of the assembly. For purposes of discussion only, an exemplary vibration isolator assembly is described below with regard to FIGS. 1 and 2. The illustrated vibration isolator is provided merely as a basis to discuss the various ways in which the methods described herein can be applied to improve the manufacture of vibration isolator assemblies (i.e., to reduce the parts count, to optimize the configuration of the bellows, etc.), and should not be read in any way as limiting on the potential application of such methods. Furthermore, the vibration isolator assembly described in connection with FIGS. 1 and 2 serves to illustrate how complicated these multi-piece assemblies are, and therefore why simplification in manufacturing in accordance with the methods presented herein is beneficial.

With reference now to FIG. 1, one exemplary vibration isolator assembly 106 is provided. The vibration isolator assembly 106 includes a pivot 108, an isolator assembly 110, an outer housing 112, and a support 114. The pivot 108 receives vibratory motion from a component to which it is coupled. The pivot 108 can also be considered a contact portion insofar as it contacts the vibrating component and/or component deflecting in response to the vibrations. The isolator assembly 110 damps and isolates the received vibratory motion and is coupled to the pivot 108 via a pivot 116. The outer housing 112 protects the isolator assembly 110 from damage and is configured to house the isolator assembly 110 therein. The support 114 attaches the vibration isolator assembly 106 to another component, and can be formed on or coupled to any suitable part of the isolator assembly 110.

Figure 2:
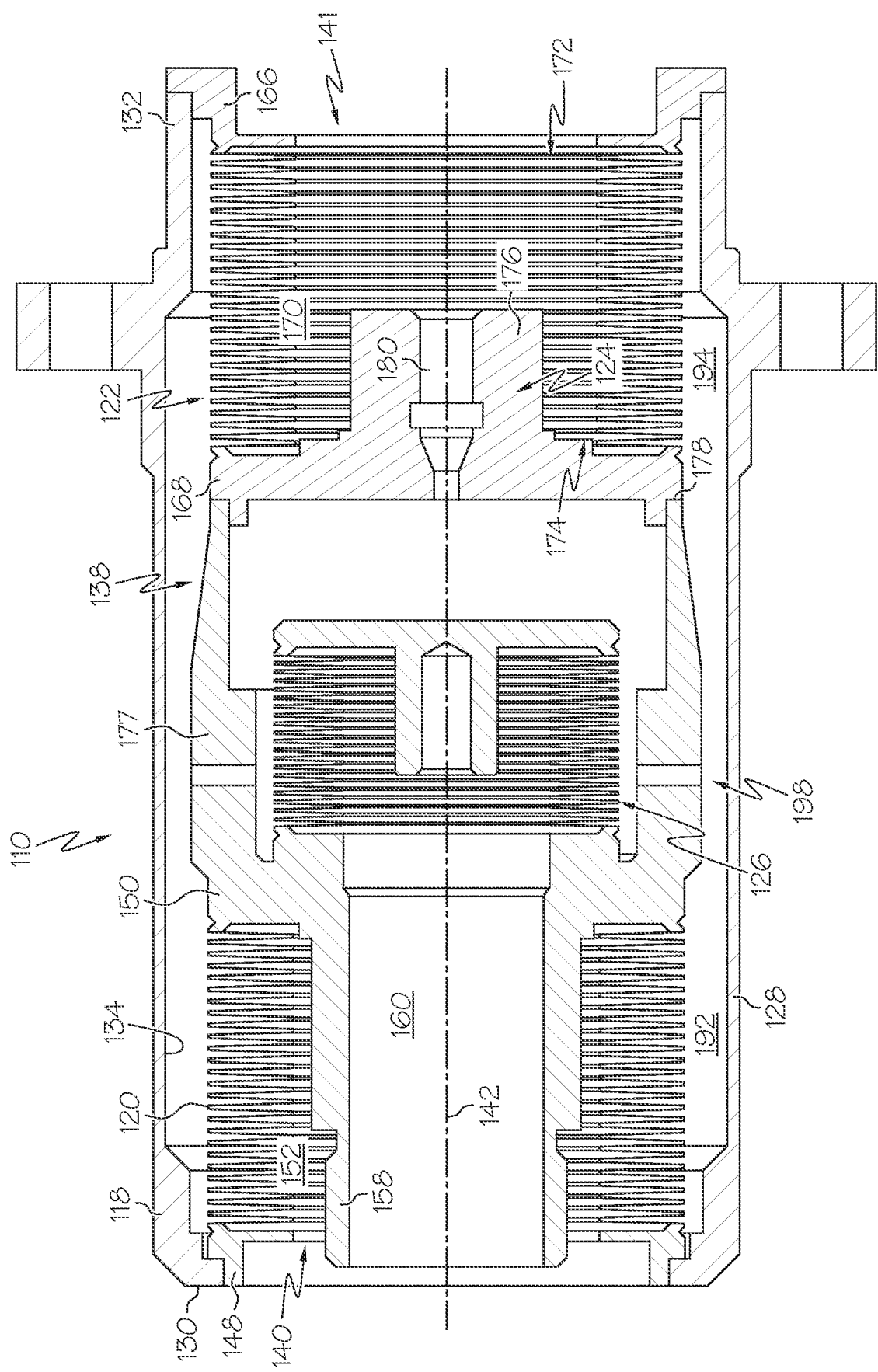
FIG. 2 is a detailed view of the vibration isolator assembly of FIG. 1.

Turning now to FIG. 2, a cross section view of the exemplary isolator assembly 110 is depicted. The isolator assembly 110 includes an assembly housing 118, a first bellows 120, a second bellows 122, a piston assembly 124, fluid and, optionally, a temperature compensation device 126. The assembly housing 118 is configured to operate with the other components of the isolator assembly 110 to provide a fixed volume of space and to enclose and seal the fluid therein. The assembly housing 118 includes at least a tube 128 that has a first end 130, a second end 132, and an inner surface 134 that defines a passage 138 extending between the first and second ends 130, 132. The assembly housing 118 also includes a longitudinal axis 142 along which the components in the passage 138 may travel. The first end 130 includes an inlet 140, the second end 132 includes an outlet 141, and the tube 128 has no openings other than the inlet 140 and outlet 141.

The first bellows 120 is disposed within the assembly housing 118 and is configured to move along the longitudinal axis 142. The first bellows 120 is coupled at one end to a first end plate 148 and at an opposite end to a second end plate 150 to thereby define first bellows interior cavity 152 therebetween. The first end plate 148 sealingly mates with the assembly housing first end 130 and couples the first bellows 120 thereto. The second end plate 150 couples to a support shaft 158 that is disposed within the first bellows interior cavity 152. The support shaft 158 is configured to provide structural support for the first bellows 120 and guides the first bellows 120 along the longitudinal axis 142 during operation. The support shaft 158 may itself include a cavity 160 configured to receive other isolator assembly 110 components therein.

Similar to the first bellows 120, the second bellows 122 is disposed within the assembly housing 118, is coupled to a first and a second end plate 166, 168, and is preferably configured to move along the longitudinal axis 142. The second bellows first end plate 166 sealingly mates with the assembly housing second end 132 and couples the second bellows 122 thereto. The second bellows second end plate 168 is coupled to the opposite end of the second bellows 122 and, together with the first end plate 166 and inner surface of the second bellows 122, defines a interior cavity 170. Just as above, each of the first and second end plates 166, 168 include openings 172, 174 formed therein that are configured to provide space for disposal of components that may extend outside of the assembly housing 118.

The piston assembly 124 is configured to operate with the first and second bellows 120, 122 to damp and isolate vibration received from the pivot 116 (shown in FIG. 1). The piston assembly 124 is disposed within the assembly housing 118 and is coupled between the first and second bellows 120, 122. The piston assembly 124 includes a piston shaft 176 and piston flange 178. The piston shaft 176 may be a single or multiple pieces (for example, shaft 176 and section 177, as shown in FIG. 2) and is aligned along the longitudinal axis 142 and is disposed in the second bellows interior cavity 170. The piston shaft 176 has an end that is coupled to the pivot 116 and another end that is coupled to the piston flange 178. The piston shaft 176 extends through the second end plate opening 174 of the second bellows 122 and is coupled directly to the pivot 116. The piston shaft 176 includes a flowpath 180 extending at least partially therethrough for receiving fluid. One section of the flowpath 180 has threaded walls that are configured to mate with a set screw.

The piston flange 178 extends radially outward from the piston shaft 176 and may be either formed integrally as part of the piston shaft 176 or may be separately constructed and subsequently attached to the piston shaft 176. The piston flange 178 is sealingly coupled to the second bellows second end plate 168. The piston flange 178 is coupled to the first bellows 120 via another section of the piston 177. The piston section 177, in turn, is coupled to the first bellows second end plate 150.

The isolator assembly 110 components are preferably configured to operate together to sealingly enclose the fluid therein in a fixed volume of space. The volume of space is separated into subvolumes, each of which is disposed in a first chamber 192 and a second chamber 194. The first chamber 192 is defined by a portion of the assembly housing inner surface 134 and an outer surface of the first bellows 120, and the second chamber 194 is defined by another portion of the assembly housing inner surface 134 and an outer surface of the second bellows 122. The first chamber 192, second chamber 194, and restrictive flow passage(s) 198 are filled with fluid. Thus, during the operation of the isolator assembly 110, when a force is exerted on the piston assembly 124, fluid is pushed from the second chamber 194, through the restrictive flow passage 198, into the first chamber 192.

For purposes of discussion only, reference will be made to an exemplary bellows, illustrated in FIG. 3, which may be implemented as bellows 120 or 122 as noted above with regard to FIGS. 1 and 2. As will be described in greater detail below, one aspect of embodiments of the present disclosure is that the components are submerged in a DMLS machine powder bed. The DMLS process is not restrained or limited by conventional roll-forming tooling, which makes this a unique approach to producing the bellows and/or other components of the vibration isolator assembly. Unlike previous methods, the vibration isolator assembly may now be optimized by utilizing, for example, a variable wall thickness in the bellows. With continued reference to FIG. 3, reference numeral 121, which highlights a portion of the bellows wall, is indicative of the features of the bellows that can be made to have a variable thickness, in contrast to present designs that are limited to a uniform thickness and require welding at each convolute.

In addition, the bellows (120, 122) may now be optimized in shape (radius of curvature, variable aspect ratio of the convolutes, tapering of wall thickness or features, etc.) to produce the optimized final assembly. Still further, multiple materials may be utilized in the assembly build, as described in commonly assigned patent application Ser. No. 13/360,126 ("Multi-Material Turbine Components," the contents of which are herein incorporated by reference in their entirety), to further optimize the vibration isolator assembly characteristics and cost.

Other recent advances may be combined with embodiments of the present disclosure to produce an enhanced vibration isolator assembly. For example, the deficiencies in prior art additive manufacturing methods have been recently overcome by using DMLS in conjunction with super alloy materials, which may require an encapsulation technology as disclosed in commonly assigned patent application Ser. No. 12/820,652 ("Methods for Manufacturing Turbine Components," the contents of which are herein incorporated by reference in their entirety) and commonly assigned patent application Ser. No. 13/235,210 ("Methods for Manufacturing Components From Articles Formed By Additive Manufacturing Techniques," the contents of which are herein incorporated by reference in their entirety). DMLS in conjunction with encapsulation, and the ability to electrochemically machine materials to exact thicknesses, makes it possible to design and manufacture structurally optimized components from graduated materials, as will be appreciated by those having ordinary skill in the art.

In general, it is expected that, based on the teachings herein, a person having ordinary skill in the art will be able to modify the vibration isolator assemblies as above to conform for use in a wide variety of applications, as the selection of size, shape, etc. of working components is generally considered to be within the level of skill of a person having ordinary skill in the art. As such, the various possible implementations of the vibration isolator assemblies should not be considered limited to any of the embodiments presented herein.

Figure 3:
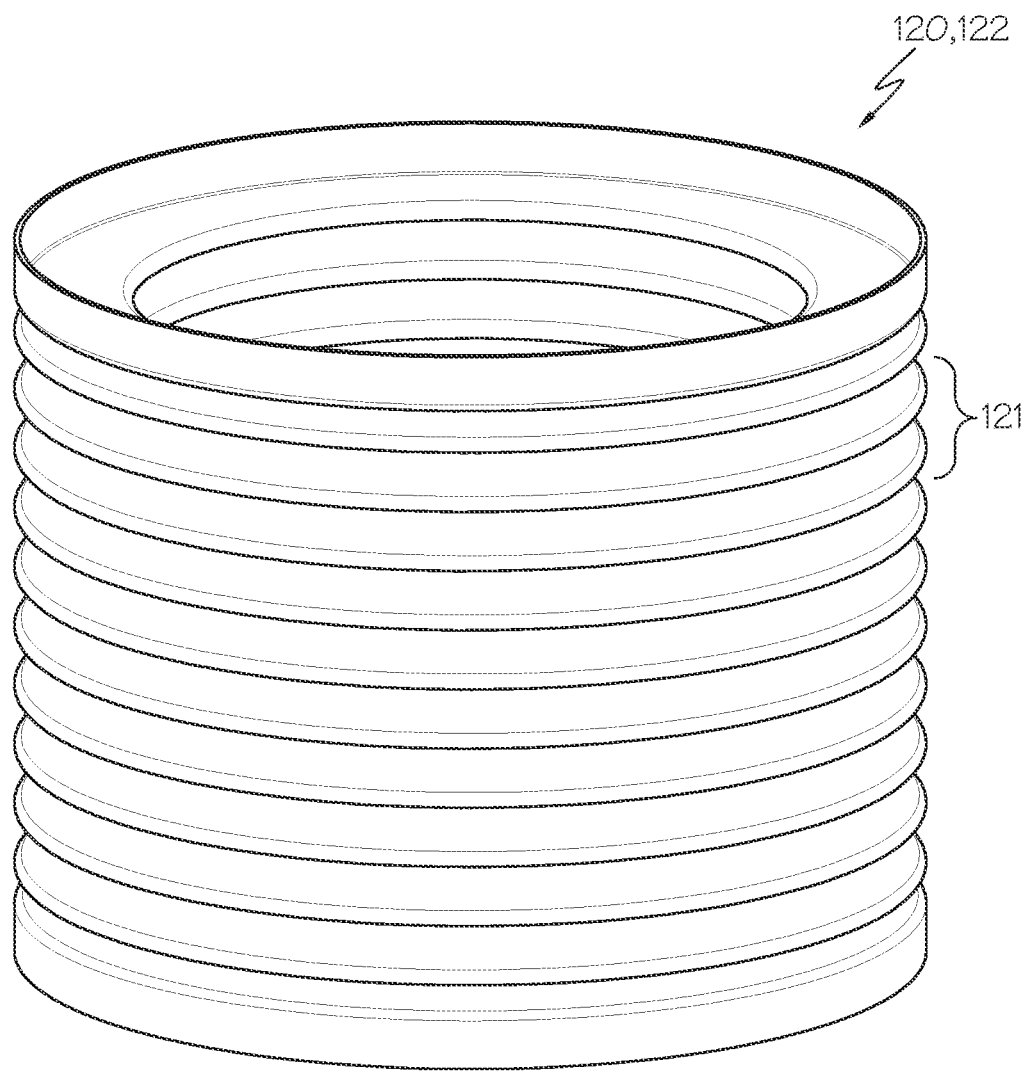
FIG. 3 is a perspective view of an exemplary bellows component that may form a part of the vibration isolator assembly as in FIG. 1.

Greater detail regarding the additive manufacturing techniques noted above will now be provided, again with reference to the exemplary bellows illustrated in FIG. 3 and more generally to the exemplary vibrator isolator assembly illustrated in FIGS. 1 and 2. It will be appreciated that certain features of the presently described vibration isolator assemblies would be prohibitively expensive to manufacture using conventional manufacturing techniques. These include the contoured or curved inlets, the varying wall thickness features, and the structurally compliant connection portions, among others. As such, designs in accordance with the present disclosure are not known in the prior art. However, it has been discovered that using additive manufacturing techniques, or other recently developed manufacturing techniques, designs in accordance with the present disclosure can be manufactured at a significantly reduced cost as compared to traditional manufacturing techniques. Additive manufacturing techniques include, for example, direct metal laser sintering (DMLS—a form of direct metal laser fusion (DMLF)) with nickel base super-alloys, low density titanium, and aluminum alloys. DMLS is discussed in greater detail below. Another technique includes electron beam melting (EBM) with titanium, titanium aluminide, and nickel base super-alloy materials. Still further, casting or metal injection molding (MIM) may be employed.

Figure 4:
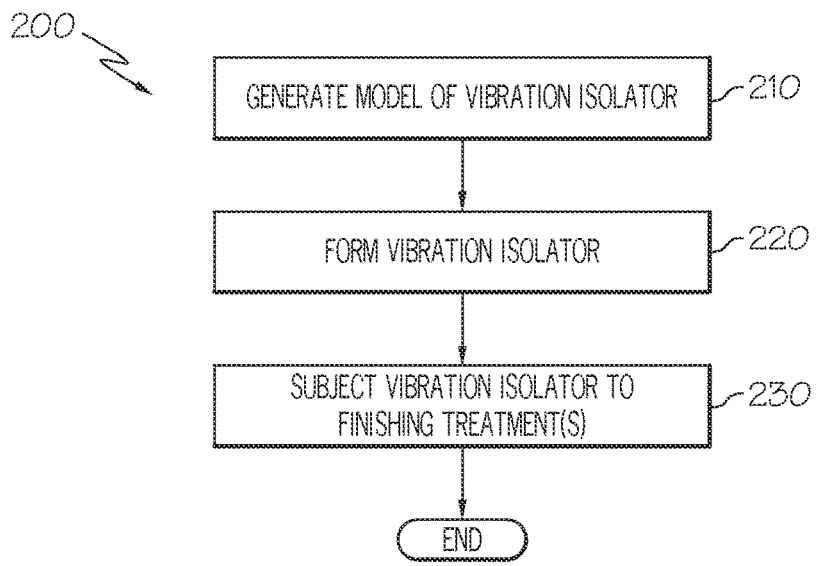
FIG. 4 is a flow diagram illustrating steps in a method of manufacturing a vibration isolator assembly in accordance with an embodiment of the present disclosure.

FIG. 4 is a flowchart illustrating a method 200 for manufacturing a vibration isolator assembly such as the bellows 120 or 122, in accordance with an exemplary embodiment using, in whole or in part, additive manufacturing techniques. In the discussion that follows, "the vibration isolator assembly" will be referred to generically as representative of any or all portions of a vibration isolator in accordance with the present disclosure, including but not limited to the bellows 120 or 122, that can be made using additive manufacturing techniques. Of course, as discussed above, various components of the vibration isolator assembly, whether made by additive manufacturing techniques or otherwise, may be brazed or otherwise joined together to form a completed vibration isolator assembly or a completed component thereof.

In a first step 210, a model, such as a design model, of the vibration isolator assembly, or component thereof such as the bellows 120 or 122, may be defined in any suitable manner. For example, the model may be designed with computer aided design (CAD) software and may include three-dimensional ("3D") numeric coordinates of the entire configuration of the vibration isolator assembly including both external and internal surfaces. In one exemplary embodiment, the model may include a number of successive two-dimensional ("2D") cross-sectional slices that together form the 3D component.

In step 220 of the method 200, the vibration isolator assembly, or component thereof, is formed according to the model of step 210. In one exemplary embodiment, a portion of the vibration isolator assembly is formed using a rapid prototyping or additive layer manufacturing process. In other embodiments, the entire vibration isolator assembly is formed using a rapid prototyping or additive layer manufacturing process. Although additive layer manufacturing processes are described in greater detail below, in still other alternative embodiments, portions of the vibration isolator assembly may be forged or cast in step 220, for example, with a single-crystal structure.

Some examples of additive layer manufacturing processes include: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the vibration isolator assembly in step 220. DMLF is a commercially available laser-based rapid prototyping and tooling process by which complex parts may be directly produced by precision melting and solidification of metal powder into successive layers of larger structures, each layer corresponding to a cross-sectional layer of the 3D component. DMLF may include direct metal laser sintering (DMLS), as previously noted above, and is a particularly preferred embodiment of this disclosure.

As such, in one exemplary embodiment, step 220 is performed with DMLF techniques to form the vibration isolator assembly. However, prior to a discussion of the subsequent method steps, reference is made to FIG. 5, which is a schematic view of a DMLF system 300 for manufacturing the vibration isolator assembly, for example one or more components of the vibration isolator assembly as shown in FIGS. 1 and 3, such as the bellows 120 or 122 as shown in FIG. 3, in accordance with an exemplary embodiment.

Figure 5:
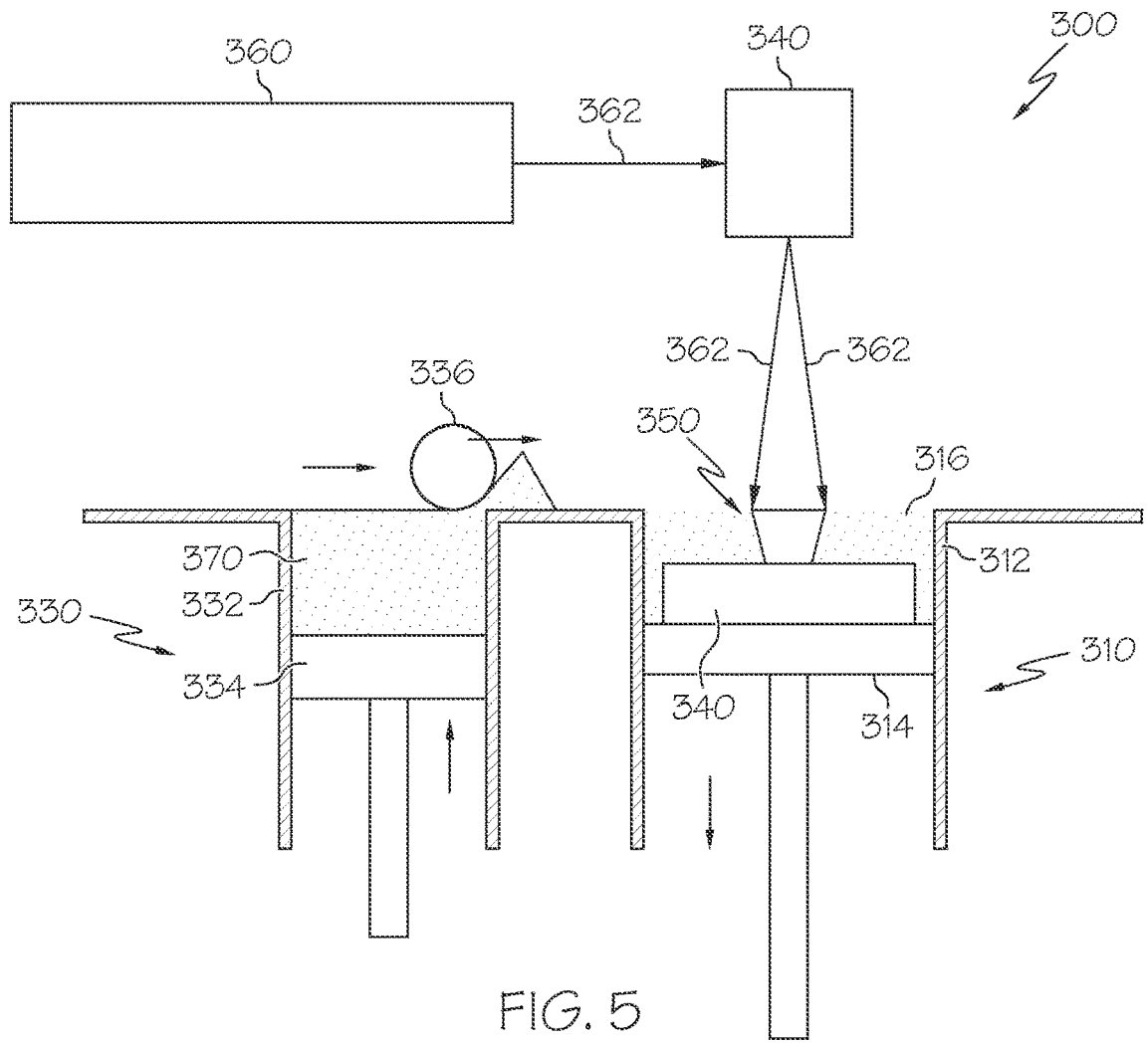
FIG. 5 is an exemplary additive manufacturing system suitable for use in manufacturing vibration isolator assemblies in accordance with the present disclosure.

Referring to FIG. 5, the system 300 includes a fabrication device 310, a powder delivery device 330, a scanner 340, and a laser 360 that function to manufacture the article 350 (e.g., the vibration isolator assembly, or a component thereof) with build material 370. The fabrication device 310 includes a build container 312 with a fabrication support 314 on which the article 350 is formed and supported. The fabrication support 314 is movable within the build container 312 in a vertical direction and is adjusted in such a way to define a working plane 316. The delivery device 330 includes a powder chamber 332 with a delivery support 334 that supports the build material 370 and is also movable in the vertical direction. The delivery device 330 further includes a roller or wiper 336 that transfers build material 370 from the delivery device 330 to the fabrication device 310.

During operation, a base block 340 may be installed on the fabrication support 314. The fabrication support 314 is lowered and the delivery support 334 is raised. The roller or wiper 336 scrapes or otherwise pushes a portion of the build material 370 from the delivery device 330 to form the working plane 316 in the fabrication device 310. The laser 360 emits a laser beam 362, which is directed by the scanner 340 onto the build material 370 in the working plane 316 to selectively fuse the build material 370 into a cross-sectional layer of the article 350 according to the design. More specifically, the speed, position, and other operating parameters of the laser beam 362 are controlled to selectively fuse the powder of the build material 370 into larger structures by rapidly melting the powder particles that may melt or diffuse into the solid structure below, and subsequently, cool and re-solidify. As such, based on the control of the laser beam 362, each layer of build material 370 may include unfused and fused build material 370 that respectively corresponds to the cross-sectional passages and walls that form the article 350. In general, the laser beam 362 is relatively low power to selectively fuse the individual layer of build material 370. As an example, the laser beam 362 may have a power of approximately 50 to 500 Watts, although any suitable power may be provided.

Upon completion of a respective layer, the fabrication support 314 is lowered and the delivery support 334 is raised. Typically, the fabrication support 314, and thus the article 350, does not move in a horizontal plane during this step. The roller or wiper 336 again pushes a portion of the build material 370 from the delivery device 330 to form an additional layer of build material 370 on the working plane 316 of the fabrication device 310. The laser beam 362 is movably supported relative to the article 350 and is again controlled to selectively form another cross-sectional layer. As such, the article 350 is positioned in a bed of build material 370 as the successive layers are formed such that the unfused and fused material supports subsequent layers. This process is continued according to the modeled design as successive cross-sectional layers are formed into the completed desired portion, e.g., the vibration isolator assembly, or component thereof such as the bellows, of step 220.

The delivery of build material 370 and movement of the article 350 in the vertical direction are relatively constant and only the movement of the laser beam 362 is selectively controlled to provide a simpler and more precise implementation. The localized fusing of the build material 370 enables more precise placement of fused material to reduce or eliminate the occurrence of over-deposition of material and excessive energy or heat, which may otherwise result in cracking or distortion. The unused and unfused build material 370 may be reused, thereby further reducing scrap.

Any suitable laser and laser parameters may be used, including considerations with respect to power, laser beam spot size, and scanning velocity. As a general matter, the build material 370 may be formed by any suitable powder, including powdered metals, such as a stainless steel powder, and alloys and super alloy materials, such as nickel-based or cobalt superalloys. In one exemplary embodiment, the build material 370 is a high temperature nickel base super alloy such as IN718. In other embodiments, MAR-M-247, IN738, titanium, aluminum, titanium-aluminide, or other suitable alloys may be employed. In general, the powder build material 370 may be selected for enhanced strength, durability, and useful life, particularly at high temperatures, although as described below, the powder build material 370 may also be selected based on the intended function of the area being formed.

Returning to FIG. 4, at the completion of step 220, the article 350, i.e., the vibration isolator assembly, is removed from the additive manufacturing system (e.g., from the DMLF system 300). In optional step 230, the vibration isolator assembly formed in step 220 may undergo finishing treatments. Finishing treatments may include, for example, aging, annealing, quenching, peening, polishing, hot isostatic pressing (HIP), or coatings. If necessary, the vibration isolator assembly may be machined to final specifications. As noted above, one example of a post-laser fusion process of step 230 is a HIP process in which an encapsulation layer is applied and pressure and heat are applied to remove or reduce any porosity and cracks internal to or on the surface of the component, as described in U.S. patent application Ser. No. 12/820,652, titled "METHODS FOR MANUFACTURING TURBINE COMPONENTS." The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer.

In one exemplary embodiment, the encapsulation layer may be a metal or alloy that is compatible with the substrate and may be applied by a plating or coating process, as described below. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger to form a compacted solid having negligible porosity.

The method 200 has been discussed above with reference to the formation of a single vibration isolator assembly, or component thereof. However, in one exemplary embodiment of the method 200, more than one vibration isolator assembly (or component thereof) may be manufactured simultaneously. Unless otherwise noted, method 200 in this embodiment proceeds as discussed above. In this embodiment of the method 200, the articles are formed on a common base block (e.g., base block 340) to provide a common orientation and a known point of reference and formed as discussed above. Successive layers can be formed for the group of articles simultaneously according to a common module or design. For example, the powdered metal may be deposited across a single working plane and one or more lasers may selectively fuse the layers of each intermediate turbine article, either sequentially or simultaneously. The articles may then be lowered together for the formation of the next layer. Simultaneous fabrication of a number of components may reduce cost and variability of the manufacturing process.

Accordingly, exemplary embodiments may enhance vibration isolator assemblies fabricated with additive manufacturing techniques, including DMLF/DMLS. In particular, the utility, design, durability, manufacturing cost, and life span of the vibration isolator assembly may be improved by manufacturing each portion of the vibration isolator assembly using designs that minimize the structural stresses that will be encountered during operation, especially the convolutes of the bellows which, in previously known techniques, were welded or brazed together, resulting in numerous potential points of weakness. Additionally, rapid prototyping and manufacturing reduces cracks and other issues and reduces costs and cycle time in the system design, particularly in the iterative environment of gas turbine engine component design.

Figure 6:
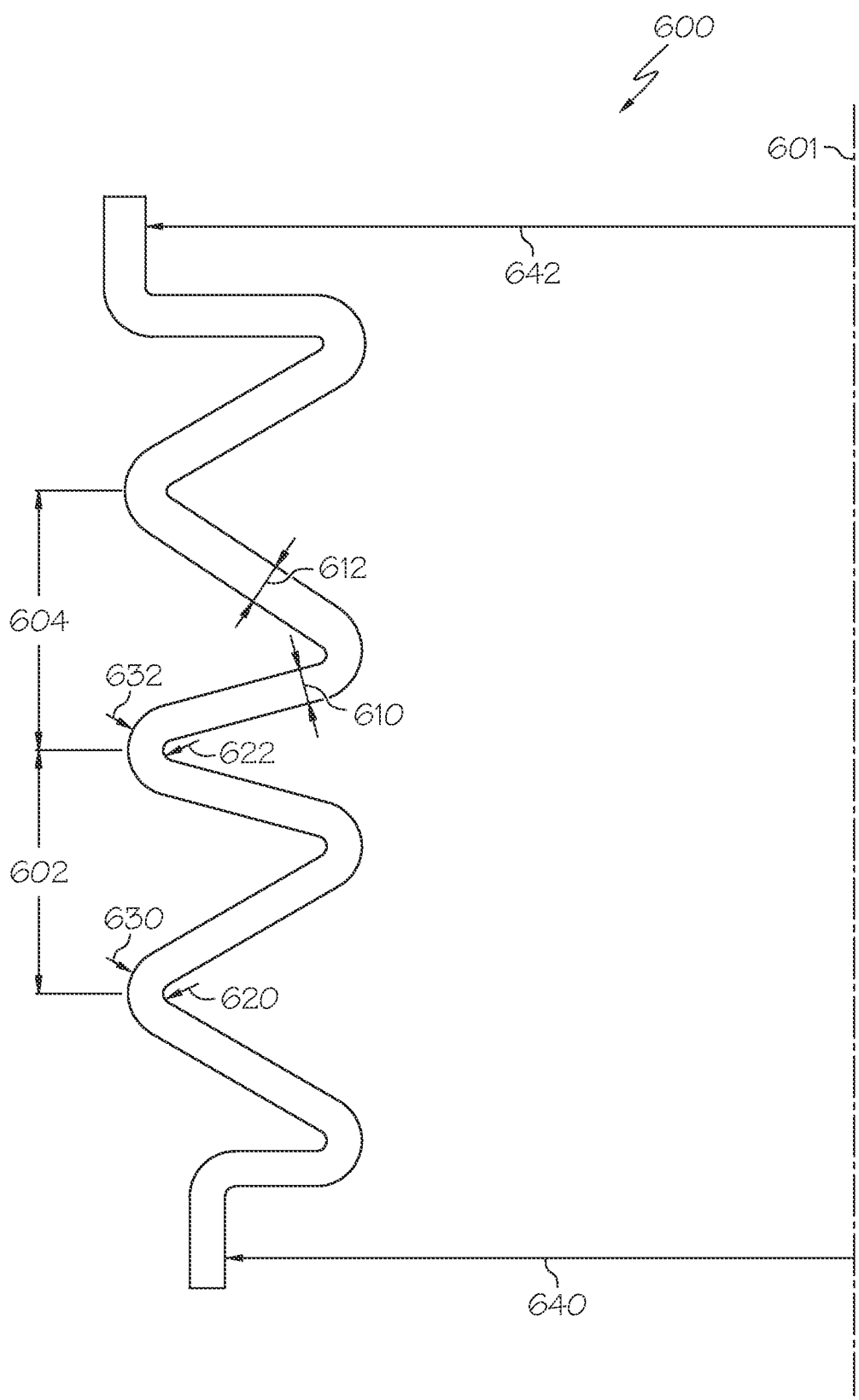
FIG. 6 is a cross-sectional view of an exemplary bellows component fabricated using additive manufacturing techniques as illustrated in FIGS. 4 and 5, and that may that may form a part of the vibration isolator assembly as in FIG. 1.

For example, the bellows 120,122 in FIG. 3 may be fabricated with additive manufacturing techniques to provide capability not possible with the prior art. For example, and referring now to FIG. 6, a bellows 600 may be axisymmetrically formed about a bellows centerline 601. A first pitch length 602 between adjacent convolutes may be different than a second pitch length 604 between two other adjacent convolutes. Similarly, a first wall thickness 610 may be different than a second wall thickness 612. The wall thickness distribution in the bellows may be tapered gradually to provide optimal stiffness or improved stress distribution in the bellows. Similarly, a first inner radius 620 may be a different size than a second inner radius of curvature 622, and a first outer radius 630 may be a different size than a second outer radius of curvature 632. Various combinations of pitch lengths, thickness distributions, inner radius of curvatures, and outer radii of curvatures may be employed in the bellows to optimize the configuration for performance, life, cost, and weight. In addition, fabrication using additive manufacturing enables the bellows diameter 640 at a first end to be different from the bellows diameter 642 at a second end if desired for enhanced performance, weight, or assembly, among other reasons.

As noted in the present disclosure, in implementing the DMLS methods described herein, the components are submerged in a DMLS machine powder bed. The DMLS process is therefore not restrained or limited by conventional roll-forming tooling, which makes this a unique approach to producing the bellows and/or other parts of the vibration isolator assembly. Unlike previously known fabrication techniques, the assembly may now be optimized by utilizing variable wall thickness in the bellows. In addition, the bellows may now be optimized in shape (radius of curvature, variable aspect ratio of the convolutes, tapering of wall thickness or features, etc.) to produce the optimized final assembly.

While at least one exemplary embodiment has been presented in the foregoing detailed description, it should be appreciated that a vast number of variations exist. It should also be appreciated that the exemplary embodiments of the vibration isolator assembly are only examples, and are not intended to limit the scope, applicability, or configuration of the invention in any way. Rather, the foregoing detailed description will provide those skilled in the art with a convenient road map for implementing an exemplary embodiment of the inventive vibration isolator assembly. It is understood that various changes may be made in the function and arrangement of elements described in an exemplary embodiment without departing from the scope of the invention as set forth in the appended claims.

What is claimed is:

1. A method for manufacturing a vibration isolator assembly, the vibration isolator assembly comprising at least one bellows component, a piston component, a shaft component, and a housing component, the method comprising:
    forming at least one of the at least one bellows component, the piston component, the shaft component, and the housing component using additive manufacturing techniques, wherein the at least one bellows component is defined as comprising a plurality of lengthwise-extending segments that alternate in succession lengthwise between: (1) a radially inwardly extending segment, and (2) a radially outwardly extending segment, wherein each radially inwardly extending segment is contiguously and physically connected to a radially outwardly extending segment at an apex that has an angle of curvature opening radially inwardly toward a longitudinal axis that passes centrally through the at least one bellows component, and wherein at least a portion of a first apex-connected radially inwardly extending segment/radially outwardly extended segment pairing has a wall thickness that is greater than a wall thickness of at least a portion of a second apex-connected radially inwardly extending segment/radially outwardly extended segment pairing such that the bellows comprises a gradually tapering wall thickness distribution for stress distribution in the bellows, wherein the at least one bellows component has a first longitudinal end and a second longitudinal end, and wherein a first bellows opening at the first longitudinal end has a diameter that is substantially the same as a diameter of a second bellows opening at the second longitudinal end, wherein the longitudinal axis passes through both of the first and second bellows openings; and
    assembling the at least one bellows component, the piston component, the shaft component, and the housing component into a complete vibration isolator assembly,
    wherein the at least one bellows component is formed using additive manufacturing techniques, and
    wherein the at least one bellows component is formed so as to comprise a variable radius of curvature, wherein variable radius of curvature is defined as the apex of one apex-connected radially inwardly extending segment/radially outwardly extended segment pairing having its radially inwardly opening angle of curvature being greater than the radially inwardly opening angle of curvature of another apex-connected radially inwardly extending segment/radially outwardly extended segment pairing.

2. The method of claim 1, wherein the additive manufacturing techniques comprise direct metal laser sintering.

3. The method of claim 1, wherein the at least one bellows component is formed so as to comprise a variable aspect ratio, wherein variable aspect ratio is defined as the lengthwise length of one apex-connected radially inwardly extending segment/radially outwardly extended segment pairing being greater than the lengthwise length of another apex-connected radially inwardly extending segment/radially outwardly extended segment pairing.

4. A vibration isolator assembly, comprising:
    a bellows component;
    a piston connected to the bellows component;
    a shaft connected to the piston component; and
    a housing component surrounding one or more of the bellows, piston, and shaft components,
    wherein the bellows component comprises a plurality of lengthwise-extending segments that alternate in succession lengthwise between: (1) a radially inwardly extending segment, and (2) a radially outwardly extending segment, wherein each radially inwardly extending segment is contiguously and physically connected to a radially outwardly extending segment at an apex that has an angle of curvature opening radially inwardly toward a longitudinal axis that passes centrally through the at least one bellows component, and wherein at least a portion of a first apex-connected radially inwardly extending segment/radially outwardly extended segment pairing has a wall thickness that is greater than a wall thickness of at least a portion of a second apex-connected radially inwardly extending segment/radially outwardly extended segment pairing such that the bellows comprises a gradually tapering wall thickness distribution for stress distribution in the bellows, wherein the bellows component has a first longitudinal end and a second longitudinal end, and wherein a first bellows opening at the first longitudinal end has a diameter that is substantially the same as a diameter of a second bellows opening at the second longitudinal end, wherein the longitudinal axis passes through both of the first and second bellows openings,
    wherein the bellows component is formed using additive manufacturing techniques, and
    wherein the bellows component comprises a variable radius of curvature, wherein variable radius of curvature is defined as the apex of one apex-connected radially inwardly extending segment/radially outwardly extended segment pairing having its radially inwardly opening angle of curvature being greater than the radially inwardly opening angle of curvature of another apex-connected radially inwardly extending segment/radially outwardly extended segment pairing.

5. The vibration isolator assembly of claim 4, wherein the bellows component comprises a variable aspect ratio, wherein variable aspect ratio is defined as the lengthwise length of one apex-connected radially inwardly extending segment/radially outwardly extended segment pairing being greater than the lengthwise length of another apex-connected radially inwardly extending segment/radially outwardly extended segment pairing.

6. The vibration isolator assembly of claim 5, wherein the bellows component and at least one of the piston component, the shaft component, and the housing component are formed as an integral structure using additive manufacturing techniques.

7. The vibration isolator assembly of claim 6, wherein the bellows component and at least one of the piston component, the shaft component, and the housing component are formed as an integral structure using direct metal laser fusion.

8. The method of claim 3, wherein a first portion of the at least one bellows component is formed with a first metallic material and a second portion of the at least one bellows component is formed with a second metallic material that is different from the first metallic material.

* * * * *